Feb. 22, 1955  W. F. SIMPSON  2,702,501
IMPLEMENT HITCH FOR TRACTORS
Filed Feb. 1, 1952  5 Sheets-Sheet 3
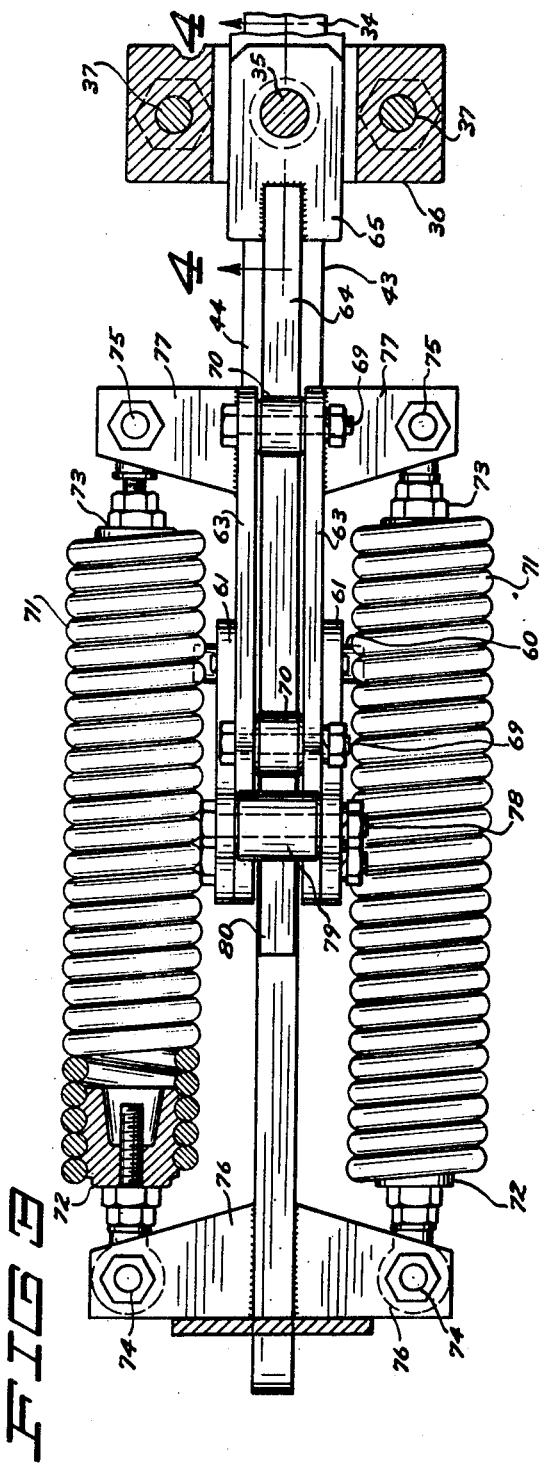
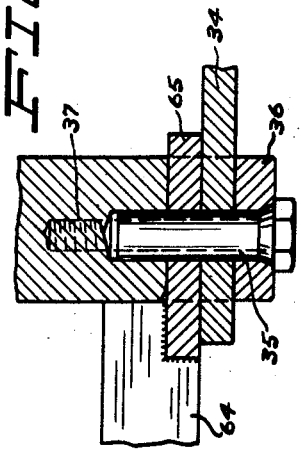
INVENTOR.
WILLIAM F. SIMPSON
BY
Carlsen + Hoyle
ATTORNEYS

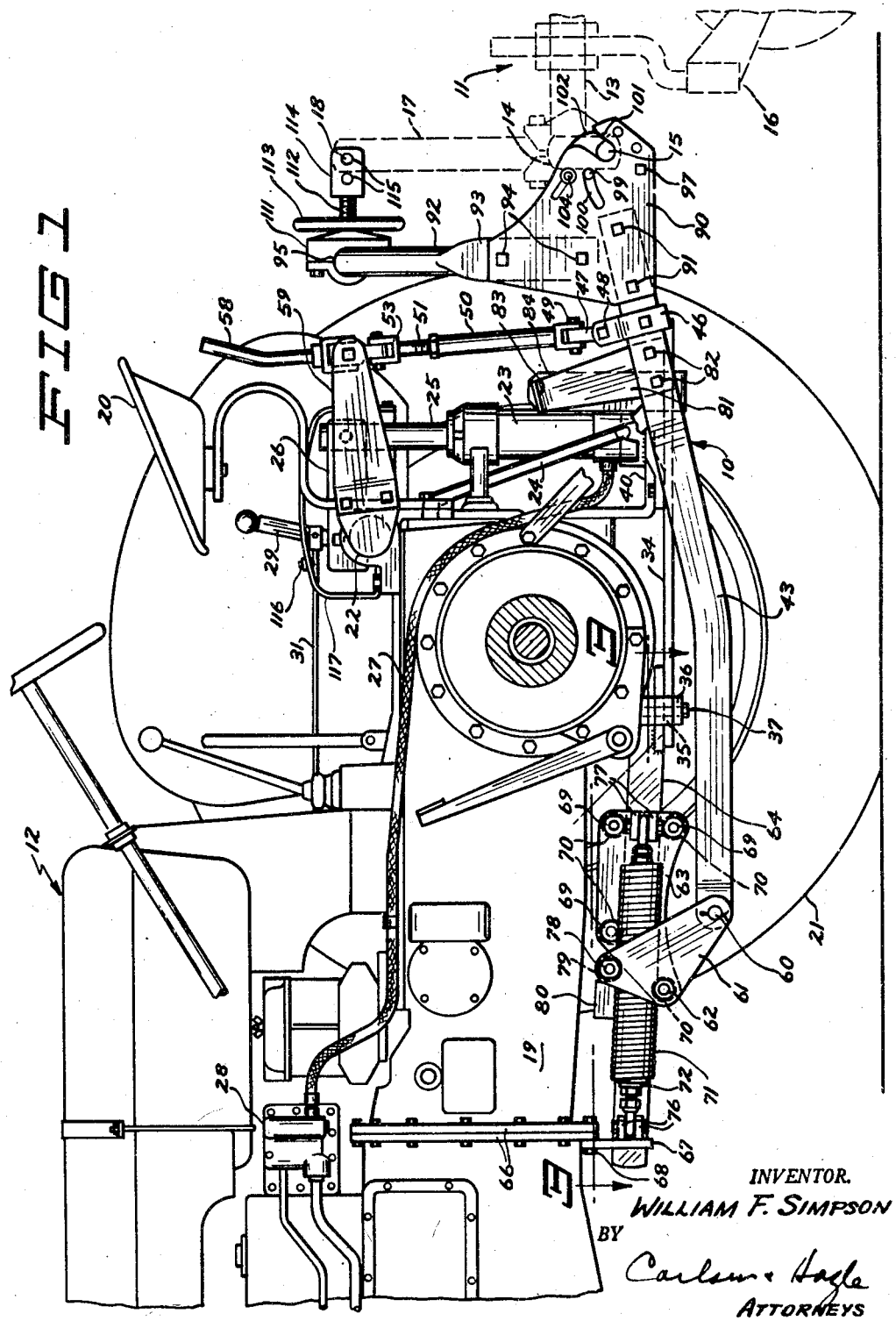

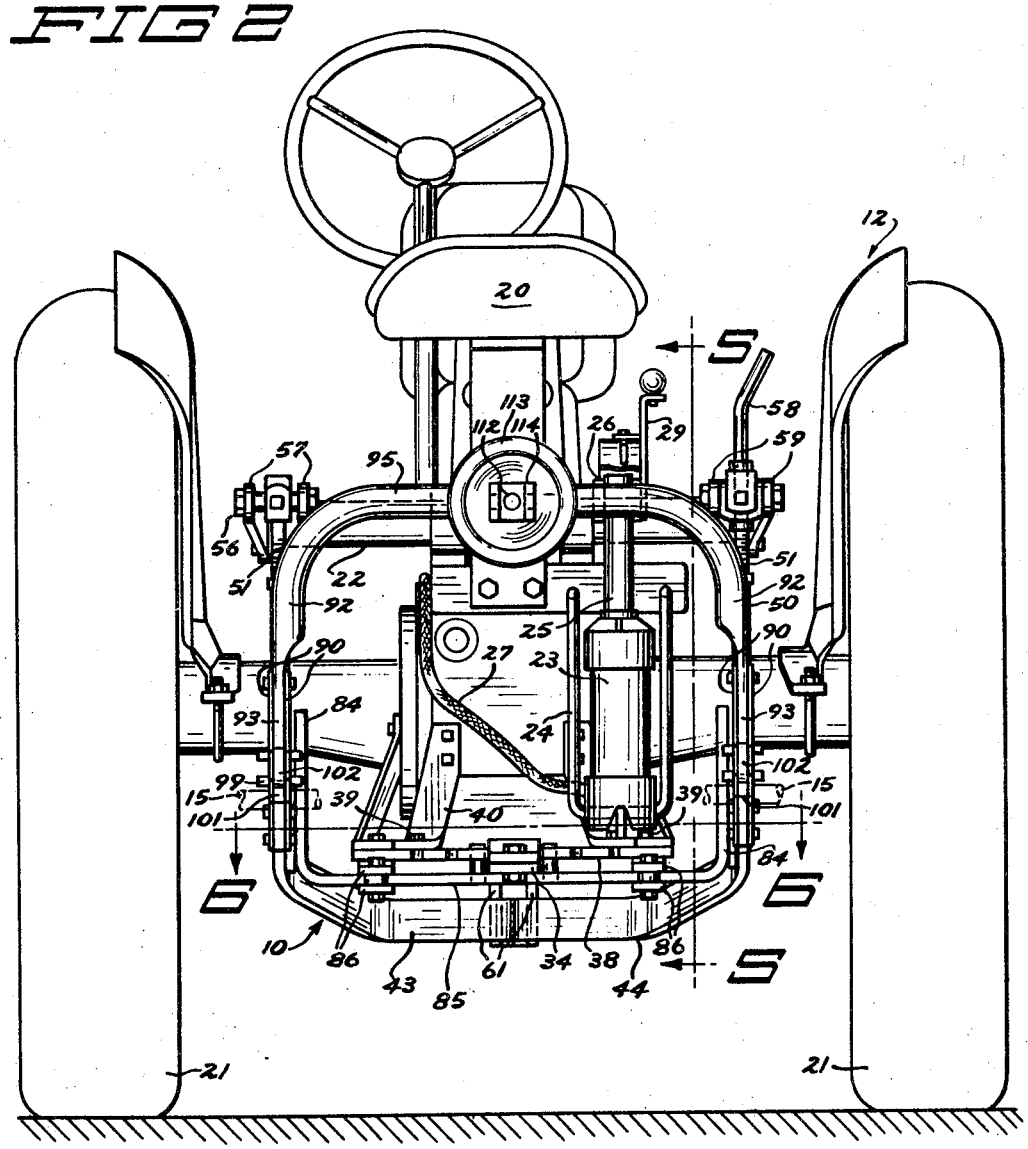

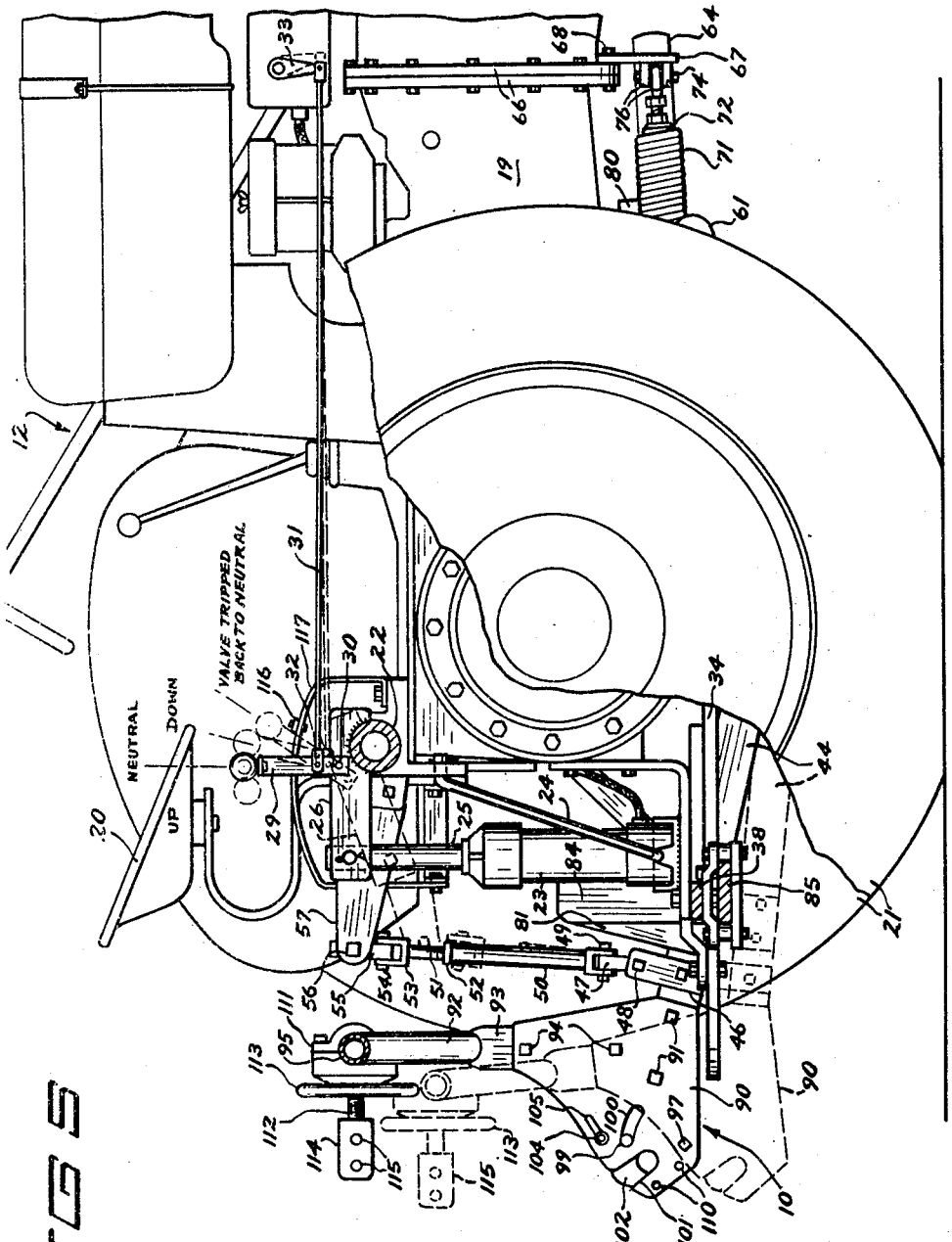

Feb. 22, 1955 — W. F. SIMPSON — 2,702,501
IMPLEMENT HITCH FOR TRACTORS
Filed Feb. 1, 1952 — 5 Sheets-Sheet 5
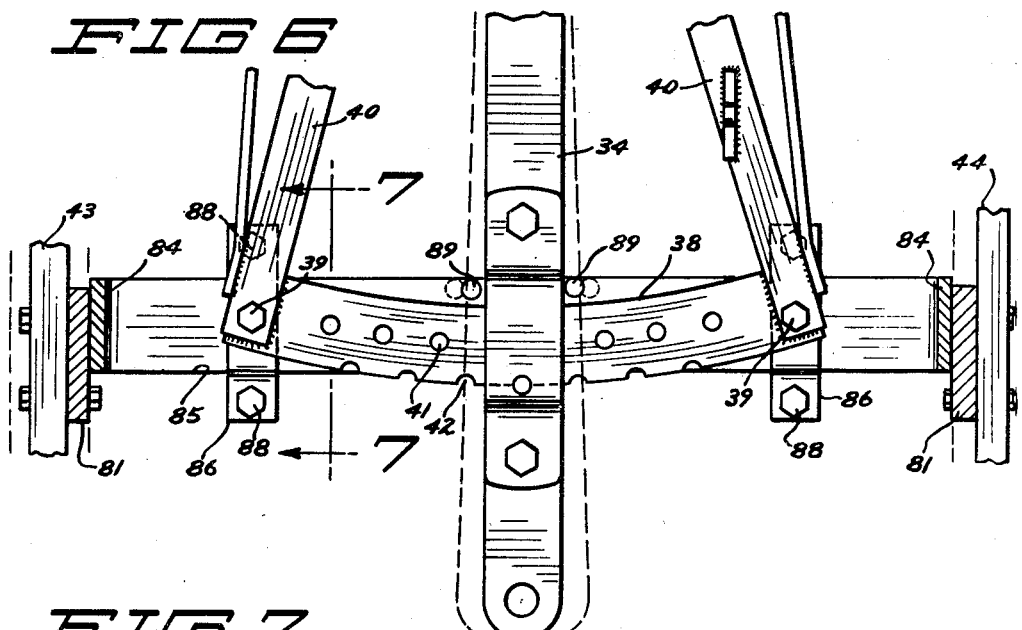
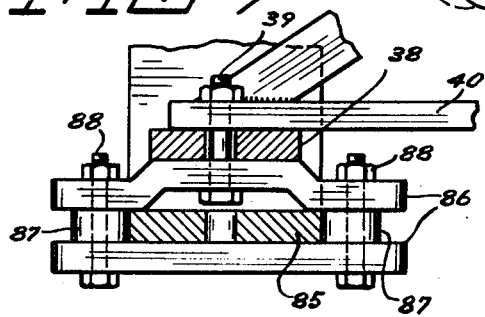
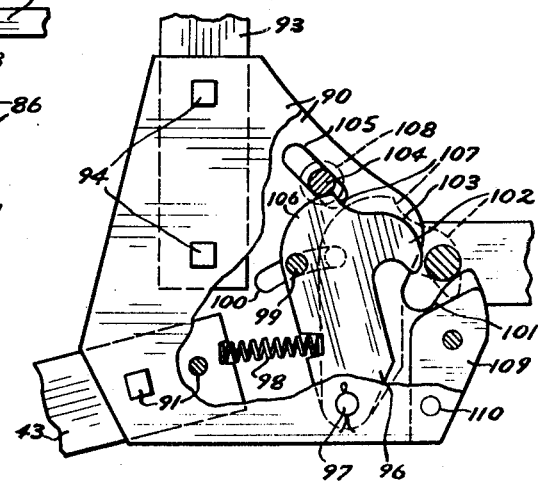
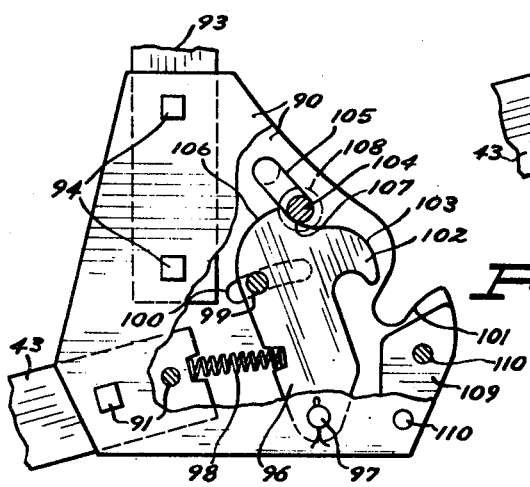
INVENTOR.
WILLIAM F. SIMPSON
BY
ATTORNEYS United States Patent Office 2,702,501
Patented Feb. 22, 1955

2,702,501

IMPLEMENT HITCH FOR TRACTORS

William F. Simpson, Louisville, Ky., assignor to Minneapolis-Moline Company, Hopkins, Minn., a corporation of Minnesota Application February 1, 1952, Serial No. 269,373

6 Claims. (Cl. 97—47.14)

This invention relates to improvements in hitches for attaching agricultural implements, such as plows, to a tractor, and is particularly designed for use in connection with the directly attached type of implement which is carried, pulled and guided by the tractor.

The primary object of the invention is to provide a hitch including a frame having a single forward point of attachment to the tractor, and having three-point connection to the implement, with provision for convenient attachment to and convenient detachment from the implement, and with one of said three-point connections to the implement being adjustable, so that the implement may be tilted in an upright and longitudinal plane to a proper working angle.

Another object of my invention is to provide a hitch structure wherein the frame is swingable upwardly and downwardly at the rear end, at which said three-point connection is made to the implement, and with power lift mechanism operatively associated with the hitch to raise and lower it as necessary for proper operation. Additionally, the hitch has limited and confined lateral swinging movement and the connections to the lift mechanism are so made that the implement may also be leveled in a transverse plane whenever necessary. Further-in accordance with my invention and its objects the various adjustments are arranged for convenient control by the tractor operator from his seat on the tractor, in order to provide the maximum operating convenience as necessary in all modern farm equipment.

Another and important object of my invention is to provide what may be described as a cushioned hitch wherein the draft or hitch frame is so connected at its forward extremity to the tractor that limited, yieldably resisted rearward movement is possible for shock absorption purposes should the implement strike an obstruction in the field. Such cushioned hitch point further embodies means for varying the actual draft point, upwardly and downwardly, in proportion to the rearward strain upon the hitch to provide a desirable draft control feature.

Further objects of the invention reside in the provision of various mechanical and structural refinements in hitch mechanisms of this nature, as will be pointed out in detail hereinafter.

These and other more detailed and specific objects will be disclosed in the course of the following specification, reference being had to the accompanying drawings, in which—

Fig. 1 is a side elevation of a hitch according to my invention, as shown upon the rear portion of a conventional tractor, the near traction wheel of which is removed and the axle and housing shown in section, this view also showing in dotted lines the forepart of an implement as connected to the hitch.

Fig. 2 is a rear end view of the hitch and tractor, with the implement itself omitted, except for the two lower points of connection thereto.

Fig. 3 is an enlarged horizontal sectional detail view of the cushioned hitch structure taken substantially along the line 3—3 in Fig. 1.

Fig. 4 is an enlarged vertical detail section along the line 4—4 in Fig. 3.

Fig. 5 is a side view similar to Fig. 1 but viewing the assembly from the opposite side, and showing also the hitch in a relatively lowered position in dotted lines, the view being taken substantially along the line 5—5 in Fig. 2.

Fig. 6 is an enlarged fragmentary plan and horizontal section of the rear portion of the hitch structure as taken substantially along the line 6—6 in Fig. 2.

Fig. 7 is a further enlarged longitudinal and vertical section along the line 7—7 in Fig. 6.

Figs. 8 and 9 are similar views, enlarged as to scale, taken from the side and partially broken away, illustrating the operation of the latch which forms one lower point of connection between the implement and the hitch.

Referring now more particularly and by reference characters to the drawing, 10 designates generally the hitch structure forming my present invention and which is for the purpose of connecting an implement, shown only partially in dotted lines and indicated generally at 11, to a conventional tractor, designated at 12, so that said implement will be transported, pulled and guided by the tractor. As an example of the type of equipment designed for use with hitches of this general class the common plow may be taken and the same, so far as material to this invention, comprises forwardly extending beams 13 connected by a transverse bar 14, clamped in place and having transverse, laterally projecting pins 15 at each side for connection to the hitch. In Fig. 1 also one of the colters 16, forming part of the usual plow of this character, is partially shown. The pins 15 form two transversely spaced lower points of connection to the implement and, in addition, the implement is provided at its center with an upright 17, which may be clamped to the cross bar 14, and at the upper end said upright has an opening for the reception of a pin 18 forming a centrally located, upper and third point of connection between hitch and implement. The tractor 12, as stated, is of conventional construction, consisting of a longitudinally arranged engine, crank case and transmission structure 19, carried by forward dirigible wheels (not shown) steerable by an operator at his station on the seat 20. The tractor also, of course, includes the usual large rear traction wheels 21 and, as customary in modern equipment of this type, has a transversely extending, oscillatable power lift roll 22, journaled in a suitable bearing support upon the upper rear portion of the housing 19. This lift roll 22 is power oscillated by means of a single acting hydraulic ram, having a cylinder 23 carried by a suitable stirrup 24 at the rear of the tractor, and with an upwardly projecting plunger 25 connected through an arm 26 to the roll. It will, of course, be obvious that the admission of fluid under pressure to the lower end of the cylinder 23, as for example through hose 27, will project the plunger 25 upwardly and turn the lift roll 22 in a counter-clockwise direction as viewed in Fig. 1, whereas the return of fluid from the lower end of the cylinder will enable the weight of the hitch and implement to move the plunger downward and the roll will turn in the opposite direction. The admission of fluid to the cylinder, and return therefrom, is controlled by a suitable valve 28 to which fluid is supplied from a pump (not shown) operated by the tractor engine, and the valve 28 is manipulated from a position convenient to the seat 20 by means of a hand lever 29. As seen in Fig. 5, this hand lever 29 is pivoted at 30 upon the arm 26 and above said pivot an operating link rod 31 is pivoted at 32 to the lever, the said rod extending forwardly and being connected to a lever 33 which operates and positions the valve. Also forming part of the conventional construction of the tractor is a draw bar 34, the forward end of which is pivotally connected by a pin 35, in and to a bracket 36 which is secured by bolts 37 to the underside of the housing 19 forward of the rear axle. The rear end of the draw bar swings laterally across an arcuate guide bar 38 secured at its ends at 39 to rearwardly diverging supports or bars 40, which are bolted at forward ends to the rear portion of the housing 19. A plurality of openings 41 and notches 42 in the guide bar 38 permits the adjustment of the draw bar 34 to lateral positions in accordance with conventional practice. Inasmuch as all of the foregoing elements are largely conventional, it is not believed that further description is needed herein.

Turning now to the hitch mechanism constituting the present invention the same comprises a main hitch or draft frame which includes rearwardly diverging and upwardly angled pull irons or draft bars 43 and 44 extending forwardly and rearwardly beneath the rear axle housing and extending at their forward ends forward of said housing. At their rear ends these draft bars 43 and 44 project beyond the rear of the tractor and rearwardly of the draw bar support assembly brackets or clips 46 are secured to the bars and project upwardly therefrom. These clips are U-shaped and between their upper ends universal joint blocks 47 are pivoted on transverse axes 48, these blocks in turn being pivotally attached upon generally longitudinal axes by pins 49 to the lower ends of tubular power lift links 50. At one side, and preferably at the left side as viewed from the rear, an upper link section 51 is screw threaded down into the tubular link 50, with a lock nut 52 for the usual purpose of adjusting the overall length of the link assembly. A fork 53 is then provided at the upper end of the link section 51 and is pivoted at 54 to an upper differential joint block 55 carried by transverse pin 56 between rearwardly directed lift arms 57 extended from the adjacent end of the lift roll 22. At the opposite side this link structure is duplicated but here the upper threaded link section 51 projects upwardly through the universal joint and is formed with a hand crank 58 by which the length of this link may be easily manually adjusted from the operator's seat. Here also, of course, the link is connected to rearwardly directed lift arms projecting from the lift roll 22 and designated at 59. It is obvious that this assembly is such that the previously described opposite rotation of the lift roll 22 will raise and lower the rear ends of the draft bars 43 and the adjustability of the links at the opposite sides of the assembly permits major adjustments of the operating level of the rear ends of the links, as well as convenient manual adjustments of the elevation of one with respect to the other, the purpose of this latter adjustment being, of course, to transversely tilt or level the implement.

The converging forward ends of the draft bars 43—44 are herein shown as pivoted at 60 between the lower rear corners of bell cranks or hitch members or crank plates 61, second lower and forward corners of which are pivoted on a pin 62 and thereby connected to the lower forward corners of parallel hitch plates 63. These plates 63 in turn are disposed at opposite sides of a longitudinally extending hitch or carrier bar 64 located on edge beneath the tractor housing 19 and provided at its rear extremity with a horizontal flange bracket 65 held upon the pin 35. The bar 64 extends forwardly a considerable distance to a point at which it is located beneath the usual bolt circle flanges 66 which join sections of the tractor housing 19, at which point a vertical flange bracket 67 is provided upon the bar and bolted at 68 to said flanges thus to rigidly support this assembly below the tractor. The hitch plates 63 are also connected by three spaced pins 69 and rollers 70 are disposed upon these pins and upon the aforesaid pin 62 to roll upon the opposite upper and lower edges of the hitch bar 64 and permit forward and rearward movements of the hitch members on said bar. The hitch plates 63 are, however, urged forwardly by powerful coil springs 71 the opposite front and rear ends of which are provided with fittings 72 and 73 by which they are connected at 74 and 75 to wing-like lateral extensions 76 and 77 which are secured rigidly to the bar 64 and plates 63, respectively. The aforesaid bell crank plates 71 include third upper corners connected by a pin 78 upon which is disposed a roller 79 above the hitch bar 74, and this roller bears forwardly against an upwardly projecting stop lug 80 welded to or otherwise made rigidly a part of the bar 64. The arrangement is thus such that the rearward pull upon the draft bars 43—44 will not only be transmitted to the hitch plates 63 through the bell crank plates 61, but furthermore the leverages effective are such that this draft force will tend to swing the bell crank plates about the axis of the pin 62, and since forward movement of the upper corners of the bell cranks is prevented by the lug 80 this force also tends to move the hitch plates in the rearward direction on the bar 64. All of such movements are resisted by the pull of the springs 71.

The rear ends of the draft bars 43—44, immediately forward of the clips 46, are provided with upwardly extending bumper wings or wear plates 81, held in place by bolts 82, the upper edges of which are turned outward as seen at 83. Located immediately inward of these plates 81 are the upturned ends 84 of a cross slide of U-shaped construction, the transverse horizontal base portion 85 of which is disposed through and between upper and lower clips 86 attached by the aforesaid bolts 39 to the supports 40 for the draw bar guide. Spacers 87 are held between the clips by bolts 88 at opposite front and rear edges of the slide 85 and the arrangement is such that this slide may move crosswise within the stationary guides formed by the clips 86 and spacers 87. Adjacent the center of the slide 85 pins 89 may be removably mounted in the slide 85 at opposite sides of the draw bar 84, so that the slide and draw bar will move in lateral directions as a unit and so that this movement may be prevented when desired by the customary means locking the draw bar itself. Unless such movement is actually thus prevented, or otherwise limited in the many ways possible, then the entire hitch structure is permitted a lateral movement limited only by the contact of the turned up ends 84 of the slide with the adjacent draw bar supports.

Secured to the rear ends of the draft bars 43 and 44 are connecting elements or latch mechanisms by which two of the actual connections to the implement 11 are made. These mechanisms each comprise a pair of irregularly spaced upright side plates 90 secured by bolts 91 to opposite sides of the bars 43—44, thus spacing the side plates apart to accommodate latches which operate between them, and the pairs of side plates at the opposite sides of the machine are joined by an inverted U-shaped yoke or bail, here shown as of tubular formation, having its downwardly turned ends 92 flattened at 93 to fit downward between the side plates to which these flattened ends are then bolted at 94. The yoke, designated generally at 95, thus connects the draft bars 43—44 transversely and at the center the yoke carries a third, upper connection means for the implement later to be described. In the space between each pair of side plates 90, rearwardly of the ends of the draft bar and yoke, I then pivot a latch 96 by its lower end upon a pin 97 traversing the plates, and this latch is biased in a rearward direction about such pivot by an expansion coil spring 98 braced against the adjacent draft bar. Such rearward motion of the latch 96 is limited by the play of an operating pin 99 in arcuate slots 100 in the side plates and the pin 99, as seen to best advantage in Fig. 3, projects some distance beyond the side plates so that it may be grasped and manipulated by hand to swing the latch. It will, of course, be understood that the pin 99 is secured through the latch itself and that the slots 100 are centered about the axis of the pin 97. The side plates 90 are provided with upwardly and rearwardly opening and angled notches 101 adapted to receive the pins 15 on the implement, and it will be noted that the mouths of these notches 100 are flared apart in order to facilitate the entrance of the pins. Each latch 96 has a cooperating hook 102 and in its rearmost position, shown in dotted lines in Fig. 8 and also shown in full lines in Figs. 1 and 5, this hook on the latch will fit over the upper and rear portions of the pins 15 in the notches 101 in such fashion as to hold them in place. The rear surface 103 of the latch 96, adjacent the hook 102, may be so shaped that the pin 15 may force or cam the latch forward and enter the notches 101 when the tractor is backed up to the implement and then lifted, thus to provide for automatic connection, but it is necessary in order to disconnect the implement to grasp the pin 99 by hand and pull the latch forwardly so that the hook 102 will clear. Each latch 96 may also be locked in its open or forward position by means of a lock pin 104 slidably mounted in downwardly and rearwardly angling slots 105 in the side plates, and in the normal operation of the latch this pin will ride the curved upper end 106, but when the latch is pulled forward to the position shown in Fig. 9 the pin 104 may drop off the surface 106 and into a shallow notch 107, so that it will prevent rearward or return motion of the latch. Here again the pin 104 is projected at each end beyond the side plates to be grasped and manipulated by hand, and so that the pin will not become displaced collars 108 are affixed to its projecting ends outside the side plates. It will also be noted in Figs. 8 and 9 that the side plates 90 carry a spacer 109, held in place by pins or rivets 110 adjacent the notches 101, in order to stiffen the assembly.

As stated hereinbefore the third upper connection element is attached to the center of the yoke 95 and the same comprises a clamp 111 in which is rotatably carried a screw 112 upon which is secured a hand wheel 113. The rear end of screw 112 is threaded into a U-shaped clevis 114 into which the upper end of the implement extension 17 may fit and through which the pin 18 is placed to form this connection. Preferably the clevis 114 has two or more openings 115 for the pin 18 to permit major forward and rearward tilting adjustments of the implement, and in addition it will be observed that the rotation of the hand wheel 113 will run the screw 112 in and out of the clevis in such manner as to easily and quite precisely tilt the implement about the axes of the pins 15. The clamp 111 is loose enough upon the yoke 95 so that this assembly may drop downward when it is disconnected from the implement and so that it may be angularly adjusted up and down, as necessary, to fit implements having extensions 17 of somewhat different heights.

From the foregoing it will be apparent that I have provided an implement hitch wherein the implement 11 will be carried at three distinct hitch or connection points, thus placing it under full control of the hitch and tractor and making it in effect an integral part of the tractor. I also provide in the crank 58 means for leveling the implement transversely and in the hand wheel 13 means for tilting or leveling the implement in the longitudinal plane, in the direction of travel. In making connection to an implement it is only necessary for the operator to back up the tractor and force the pins 15 into the notches 101, wherein they will then be retained by the hooks 102 of the latches 96, and he is then able to reach down to the rear to engage the clevis 114 with the extension 17 and insert the pin 18 to complete the hitching-up operation without leaving his station on the tractor. To disconnect the implement the pin 18 is removed and the latches 96 are swung forward by the pins 99 until the latches become locked, as seen in Fig. 9, by the pins 104, whereupon the operator may remount the tractor and drive it away, leaving the implement standing.

The hitch mechanism beneath the tractor has the dual purpose of absorbing shocks incident to the instrument striking an obstruction in the field and automatically controlling the draft point, and this is also a two-stage operation. In the first stage the draft control results from the swinging of the bell crank plates 61 about their pivots 62, which motion adjusts the hitch point 60 vertically through a substantial range. In the case of a plow it is well known that in average land tough or compacted spots will occasionally be met, such as temporary roadways or areas trampled by stock, and when plowing such land it has been frequently necessary to shift the tractor from a higher to a lower gear to pull through these compacted spots, but this is not necessary with the hitch of my invention. When the plow strikes a tough spot the resulting added draft will swing the bell crank plates 61 counterclockwise, as viewed in Fig. 1, so that the hitch point 60 rises, and this in turn will tilt the plow points slightly upward causing the plow to run shallower and the reduced draft then allows the tractor to pull through without shifting gears. Immediately as the plow again reaches the normal land the reduced pull will allow the springs 71 to reassert themselves and return the hitch point 60 to its normal, relatively lower position and the plow will, of course, run deeper again.

Should the plow or implement strike an obstruction the hitch passes through this draft controlling phase instantly because the pull is so much greater and because of the diminishing leverage of the bell crank plates against stop 80 the whole assembly then of the bell crank plates and hitch plates 63 will travel rearwardly on the bar 64. A substantial range of such travel is possible and as the rearward travel reaches its limit the tractor will be brought to a stop against the full tension of the springs 71 but without creating damaging shock forces. The advantages of this two-stage and two-fold operation of the hitch will be readily evident to those skilled in the art and I regard this as an important feature of the invention.

The operator, of course, has complete control of the vertical position of the implement by the power lift mechanism and since the implement is connected at three horizontally and vertically spaced points it will be transported, raised and lowered as an integral part of the hitch and tractor, practically speaking. In Fig. 5 it will be noted that the hand lever 29, by which the operator manipulates the valve to control the lift ram, is so arranged that it is moved rearward to the indicated dotted line position when the implement is to be raised. To lower the implement the hand lever 29 is moved in the opposite direction to the dotted line position so designated, and in this case, since the lever itself is pivoted upon arm 26 carried by the lift rod 22, the lever will tend to swing further forward due to the pull of the rod 31 as this arm 26 swings downward toward the indicated dotted line position. There is then provided an adjustable stop 116 upon a bracket 117 secured to the tractor adjacent the operator's station and this stop may be so positioned that the lever 29, as it is swung forward by the pull of the rod 31 as arm 26 descends, will abut the stop as indicated in dotted lines. Continued movement in the downward direction of the arm 26, as the implement descends, will then at once cause the stop 116 to trip the lever 129 back to its neutral position, at which point the implement's downward travel will be brought to a halt. Proper positioning of the stop 116 will thus make it possible to automatically control the working depth of the implement and it is only necessary for the operator each time to swing the lever 29 forward to start the motion and at the proper point the lever will be tripped back to neutral.

The foregoing automatic working depth control is primarily of use in connection with implements such as cultivators, harrows and the like that have no other depth adjustment and which are carried at the desired working depth by the tractor. However, for plows such as here partially illustrated at 11 I prefer to use what I call a free-floating action of the hitch, for which purpose the stop 116 is set beyond the range of the control lever 29, so that this lever will not be tripped back to the neutral or "off" position. As a result, when the lever 29 is moved forward to lower the plow the valve will now remain open and the jack 23—25 is then free of hydraulic control or lock, and it will float upwardly and downwardly with the linkage connected to the hitch. The hand wheel 113 is in this case adjusted to tilt the plow in a longitudinal vertical plane and so as to regulate the pitch or suck of the plow for the desired working depth. Now as the plow is lowered it follows an arc centered about the hitch point 60 and the pitch or suck gradually reduces as the plow enters the ground until upon leveling off the plow will be at the desired working depth. In subsequent operation the plow will then be pulled and guided solely from the hitch point 60 and as the tractor travels over uneven land the plow will follow this hitch point 60 with but imperceptible variations in plowing depth.

It is understood that suitable modifications may be made in the structure as disclosed, providing such modifications come within the spirit and scope of the appended claims. Having now therefore fully illustrated and described my invention, what I claim to be new and desire to protect by Letters Patent is:

1. For connecting an implement to a tractor, a hitch mechanism of the character described, comprising draft bars for attachment at forwardly arranged ends to the underside of the tractor, the bars diverging toward their rear ends, latch means on the rear end of each draft bar for attachment at two transversely spaced points to the implement, an inverted U-shaped bail member connecting the rear ends of the draft bars, attachment means at the center of the bail member for connection at a third point to the implement spaced upwardly with reference to the said latch means, and the said attachment means on the bail member being adjustable forwardly and rearwardly and also upwardly and downwardly.

2. For connecting an implement to a tractor, a hitch mechanism of the character described, comprising draft bars for attachment at forwardly arranged ends to the underside of the tractor, the bars diverging toward their rear ends, latch means on the rear end of each draft bar for attachment at two transversely spaced points to the implement, an inverted U-shaped bail member connecting the rear ends of the draft bars, an attachment means mounted on the bail member for connection to the implement at a third point spaced upwardly from the other two points, the said attachment means including a pivot connection for up and down swinging adjustment.

3. For connecting an implement to a tractor, a hitch mechanism of the character described, comprising draft bars for attachment at forwardly arranged ends to the underside of the tractor, the bars diverging toward their rear ends, latch means on the rear end of each draft bar for attachment at two transversely spaced points to the implement, an inverted U-shaped bail member connecting the rear ends of the draft bars, an attachment means mounted on the bail member for connection to the implement at a third point spaced upwardly from the other two points, the said attachment means including a pivot connection for up and down swinging adjustment, and a hand wheel and screw for adjusting the means forwardly and rearwardly and thereby tilting the implement about the two lower connection points.

4. For connecting an implement to a tractor, a hitch mechanism of the character described, comprising draft bars for attachment at forwardly arranged ends to the underside of the tractor, the bars diverging toward their rear ends, latch means on the rear end of each draft bar for attachment at two transversely spaced points to the implement, an inverted U-shaped bail member connecting the rear ends of the draft bars, a clamp loosely mounted on the bail member, a screw rotatably anchored in the clamp member and having means for manual adjustment, and a clevis adjustable by the screw and for attachment at a third point to the implement.

5. For connecting an implement to a tractor, a hitch mechanism of the character described, comprising draft bars for attachment at forwardly arranged ends to the underside of the tractor, the bars diverging toward their rear ends, latch means on the rear end of each draft bar for attachment at two transversely spaced points to the implement, each latch means including notched side plates and a spring biased swingable latch having a nose for holding an implement part in the notch, separate means for manually actuating each latch and for locking it in an implement releasing position, means cross connecting the draft bars at their rear portions, and a third connection means on said cross connecting means for attachment to the implement at a point spaced vertically from the other two points.

6. For connecting an implement to a tractor, a hitch mechanism of the character described, comprising draft bars for attachment at forwardly arranged ends to the underside of the tractor, the bars diverging toward their rear ends, latch means on the rear end of each draft bar for attachment at two transversely spaced points to the implement, each latch means including notched side plates and a spring biased swingable latch having a nose for holding an implement part in the notch, a U-shaped bail having downturned ends fastened to the side plates of the latch means, and a third connecting means on the bail for connection to the implement.

References Cited in the file of this patent

UNITED STATES PATENTS

| Number | Name | Date |
|---|---|---|
| 1,575,773 | Lambert | Mar. 9, 1926 |
| 2,324,840 | Hipple | July 20, 1943 |
| 2,375,970 | Williams, Jr. | May 15, 1945 |
| 2,447,097 | Silver | Aug. 17, 1948 |
| 2,483,565 | Strandlund | Oct. 4, 1949 |
| 2,505,609 | Ego | Apr. 25, 1950 |
| 2,513,783 | Blessinger | July 4, 1950 |
| 2,567,736 | Silver et al. | Sept. 11, 1951 |
| 2,579,274 | Richey | Dec. 18, 1951 |
| 2,580,532 | Dugger | Jan. 1, 1952 |
| 2,599,617 | Davis | June 10, 1952 |